United States Patent [19]

Scriminger

[11] 4,295,744
[45] Oct. 20, 1981

[54] SLURRY GUN

[75] Inventor: William F. Scriminger, Muskogee, Okla.

[73] Assignee: Muskogee Environmental Conservation Co., Muskogee, Okla.

[21] Appl. No.: 32,165

[22] Filed: Apr. 23, 1979

[51] Int. Cl.³ .............................................. B28C 5/06
[52] U.S. Cl. ...................................................... 366/3
[58] Field of Search ................... 366/336, 2, 3, 10, 11, 366/337; 106/89, 103

[56] References Cited

U.S. PATENT DOCUMENTS

| | | | |
|---|---|---|---|
| 2,087,679 | 7/1937 | Ball | 366/10 |
| 3,237,805 | 3/1966 | Stogner | 366/3 |
| 3,251,583 | 5/1966 | Mason | 366/10 |
| 3,565,648 | 2/1971 | Mori | 106/103 |
| 3,682,446 | 8/1972 | Eron | 366/336 |
| 3,759,730 | 9/1973 | Trief | 106/103 |

*Primary Examiner*—Robert W. Jenkins
*Attorney, Agent, or Firm*—James H. Chafin

[57] ABSTRACT

A method and apparatus for the mixing of fly ash and a wetting agent to obtain a slurry for the ultimate disposal of the fly ash. The apparatus is a slurry gun having an introduction chamber, the fly ash is aerated and introduced vertically into the chamber under pressure. The wetting agent is introduced horizontally into the chamber under a pressure greater than the aerated fly ash and the combination is moved through a twisted path to create turbulence for mixing.

3 Claims, 1 Drawing Figure

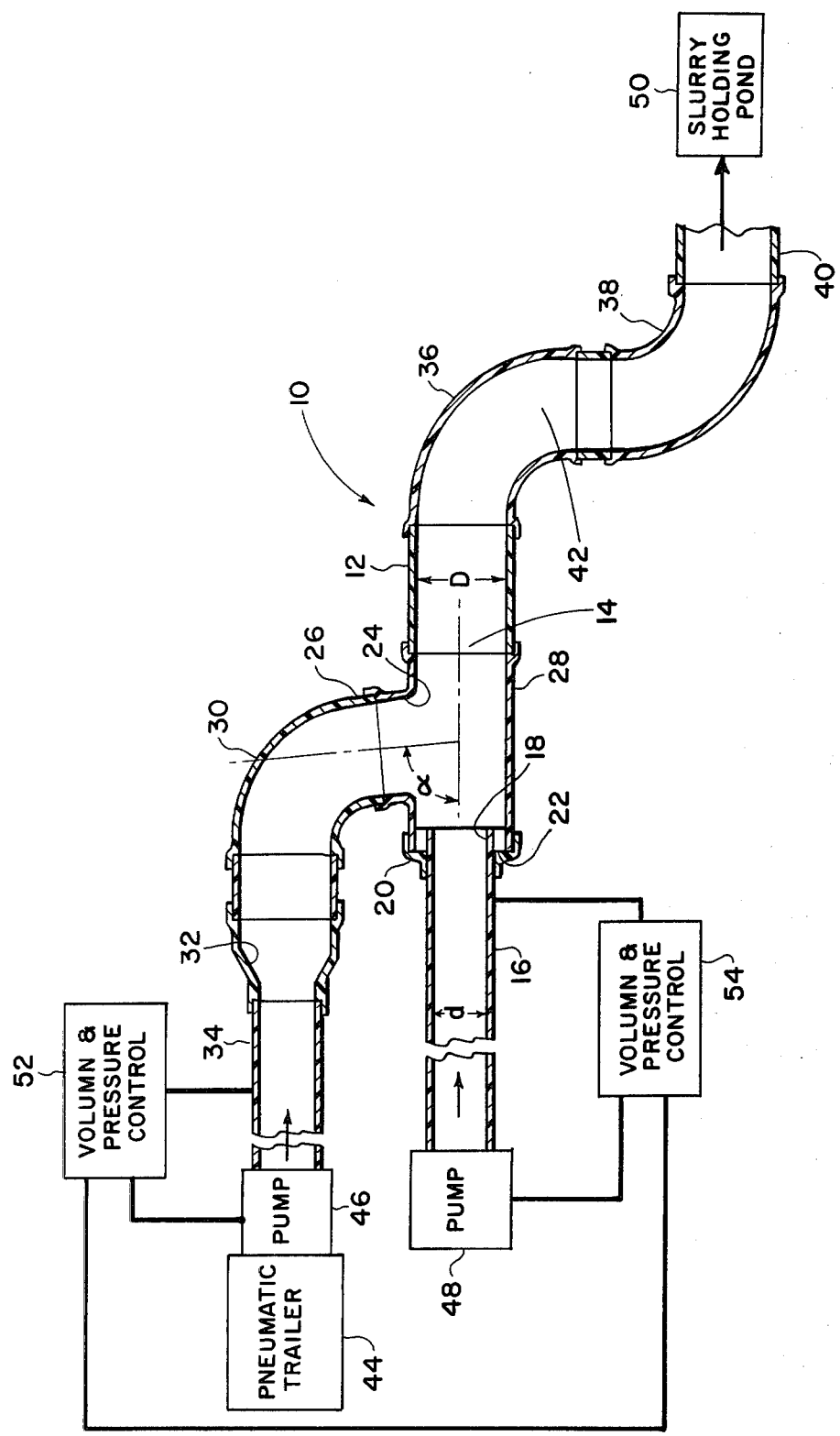

SLURRY GUN

BACKGROUND OF THE INVENTION

1. Field of the Invention

The present invention relates to a method and apparatus for the disposal of fly ash by mixing the fly ash to form a dustless slurry.

2. History of the Invention

The presently increased useage of coal burning power plants due to the scarcity of petroleum products has brought to the forefront a long existing problem, that being the efficient disposal of fly ash residue.

Fly ash is a finely divided ash residue produced by the combustion of coal, and is particularly prevalent in connection with the burning of pulvarized coal.

The fly ash is a wispy material and is typically prevented from being carried off with the exhaust gasses of the furnace by use of fly ash collection means such as electrostatic precipatators or bag houses. Normally associated with coal burning furnaces, are fixed containers or silos for holding the fly ash until it can be disposed of.

One method of disposal of fly ash is to remove the fly ash from the fixed storage containers and mix it with a wetting solution which, if mixed in proper proportions causes it to set up and harden in a matter not unlike cement.

One method of such disposal is to mix the fly ash with a wetting solution to form a slurry and then to pump this slurry into either molds for hardening or into slurry disposal ponds.

One problem in producing the slurry is that if the slurry is mixed too wet, the particles will become suspended in the slurry and upon drying will reproduce an ash that can escape into the atmosphere and become an atmospheric pollutant. On the other hand if the slurry is mixed too dry some of the wispy particles may again escape and often times the slurry pipe will become caked and clogged.

In summary, the fly ash must be constantly removed from the furnace and must be handled very carefully lest it become an atmospheric pollutant.

SUMMARY OF THE PRESENT INVENTION

The present invention provides an efficient and ecologically sound system consisting of method and means for removing the fly ash from fixed containers, mixing the fly ash into a wetting solution to form a slurry and to pump this slurry into either molds or into a slurry holding pond so that the fly ash may harden into cement like ingots, cakes or the like for either further handling or permanent disposal.

Applicant has discovered that fly ash slurry made up of aerated fly ash mixed with water may be handled in plastic tubing similar to or identical with the tubing presently being used in sewer and water transportation lines.

The apparatus consists of a slurry gun which generally comprises a substantially straight pipe section wherein both ash and water are introduced for mixing to form a slurry. Water is introduced in one end of this straight pipe section so that the flow of water is longitudinally aligned with the pipe section and is controlled both in volume and pressure at the introduction port.

Fly ash is aerated and pumped from a pneumatic trailer or storage container for the fly ash and is introduced into the aforementioned straight pipe section at a substantially right angle thereto adjacent to and downstream of the water introduction port. The volume of ash contained in the aerated ash introduction system is controlled along with the air pressure at or near the point in which it is introduced into the straight pipe. The water pressure at the water inlet port is kept at a higher pressure than the air pressure introducing the aerated ash to prevent ash from blowing back up the water line.

The opposite end of the straight pipe section is provided with two right angle consecutive bends which constitute a mixing zone for thoroughly mixing the water with the aerated fly ash to form a slurry. Since the volume of fly ash being introduced into the slurry gun and the volume of water being introduced is controlled, a dustless slurry is produced which may then be discharged into disposal ponds or ingot molds where it sets up hard due to the correct proportioning of the ash/water slurry.

Applicant has discovered that the use of standard schedule 40 plastic sewer pipe may be used as the material for constructing the slurry gun. This material is suitable to prevent sticking of the slurry to the gun which would result in buildup and eventual blockage of the slurry gun or discharge pipe.

Whereas, automatic controls may be incorporated in connection with the slurry gun to control the volume and pressure of both the aerated ash and the water or wetting agent, has been found in actual use that volume of the ash may be controlled by the pump which is introducing the aerated ash and pressure may be controlled by sizing the inlet aerated ash lines. Likewise, the volume of the water or wetting agent introduced to the gun may be controlled by a suitable water pump and pressure of the water entering the slurry gun may be controlled by sizing the inlet water line. Therefore, the invention can be practiced without the use of elaborate volume and pressure and control mechanisms and feed back systems.

DESCRIPTION OF THE DRAWINGS

Other and further advantageous features of the present invention may hereinafter more fully appear in connection with a detailed description of the drawings in which:

The FIGURE is a side elevational sectional view of the slurry gun which is combined with a functional flow block diagram to depict operation of the disposal system.

DESCRIPTION OF THE PREFERRED EMBODIMENT

Referring to the drawings in detail, reference character 10 generally indicates a slurry gun for mixing an aerated fly ash with a wetting agent such as water to produce a slurry that can be pumped in liquid form into holding ponds or molds for solidification to facilitate handling in the permanent disposal of that fly ash.

The slurry gun comprises an elongated straight cylindrical pipe segment 12, the interior of which forms a material introduction chamber 14. The pipe segment 12 has a diameter designated by reference character D. In longitudinal alignment with and at one end of the pipe segment 12 is a water introduction pipe 16 having diameter indicated by reference character d, the diameter d being less than the diameter D. An inner end 18 of the water pipe 16 is connected to the end of the straight pipe segment 12 by means of a suitable coupler member 20. The space between the smaller water introduction pipe 16 and the large straight pipe segment 12 may be filled with a suitable annular shaped gusset 22.

An aerated ash introduction port 24 is provided in the top of the straight pipe segment 12. An aerated ash introduction pipe segment 26 is attached to the pipe segment 12 in communication with the port 24 by a suitable T-coupling device 28. The aerated ash introduction pipe 26 is of substantially the same diameter as the pipe segment 12 and is provided with a suitable elbow section 30. The opposite end of the pipe segment 26 is provided with a reducer joint 32 the small end of which is connected to an aerated ash inlet pipe 34. The end of the straight pipe segment 12 opposite the water inlet end is provided with a first downwardly turned elbow section 36 which flows directly into an adjacent horizontally turned elbow 38, the outer end 40 of which is considered the slurry discharge section. The space inside the elbow sections 36 and 38 constitute a mixing zone 42.

As stated hereinbefore the fly ash itself may be collected in a fixed container such as a silo or often in pneumatic trailers generally indicated by the block 44. Fly ash contained therein may be aerated or suspended in air and pumped out of the pneumatic trailer by means of a suitable pumping mechanism 46. The outlet of the pumping mechanism 46 is connected to one end of the aerated ash inlet pipe 34. The volume flow rate of the fly ash may be controlled by means of the pumping mechanism 46 and the pressure within the inlet pipe 34 may be controlled by simply pre-sizing the pipe 34.

On the other hand the wetting agent such as water may be pumped into the water inlet pipe 16 by means of a suitable pumping mechanism 48. The volume rate of the wetting agent may be controlled by the pump itself and the inlet water pressure at the end 18 thereof may be controlled by the sizing of the water pipe 16.

It is necessary for the proper operation of the slurry gun that the water pressure at the inlet port 18 be higher than the air pressure at the aerated ash inlet port 24 to prevent suspended ash particles from blowing into the water pipe 16. The reason that water coming through the inlet port 18 does not travel into the aerated ash inlet port 24 is for two reasons, the first being the water inlet pipe is in axial alignment with the elongated pipe segment 12 downstream of the aerated inlet port 24. The second reason is that the vertical orientation of the aerated ash inlet 24 allows gravity to keep the water from flowing upward through the ash inlet port.

It is also noted that considerable mixing of the aerated ash and water takes place within the straight pipe segment 12. The two consecutive elbow sections 36 and 38 causes sufficient turbulence to provide uniform mixing of the fly ash with the wetting solution.

The discharge section 40 of the slurry gun is then simply connected to suitable piping to move the slurry into a holding pond or mold generally indicated by reference character 50.

Simple pump controls and sizing of the aerated ash inlet pipe 34 and the water pipe 16 may provide both the correct amount of ash/water mixture and prevent blowback of ash in the water line. It is noted that suitable volume and pressure control mechanisms such as the pneumatic volume and pressure control mechanisms indicated by reference character 52 and the liquid volume and pressure control mechanism 54 may be utilized to control the volume and pressure. Reference character 56 generally indicates a feedback line between the volume and pressure control units 52 and 54 so that the proper mixture always occurs and the proper relative pressures are maintained.

The applicant has found that the following is an operable use of the equipment:

Ash from the bulk pneumatic trailers 44 is aerated and blown into the slurry gun 10 by means of the pumping unit 46 at the rate of 1,500 pounds of fly ash per minute, using three hundred cubic feet per minute of air at approximately 12 p.s.i. at the ash inlet port 24. This volume and pressure is put into effect by utilizing standard schedule 40 plastic sewer piping, the ash inlet line 34 having a four inch diameter and the ash inlet port 24 having a six inch diameter.

Also for the purposes of the present example the straight pipe segment 12 inner diameter (D) is six inches, the six inch diameter being maintained through the mixing zone 42 and the discharge line 40. The water inlet line 16 is of a four inch diameter opening at the port 18 into the six inch diameter pipe 12.

Approximately 200 gallons per minute of water is simultaneously pumped in at an inlet port pressure of approximately 15 p.s.i.

The ash and water are then effectively mixed in the two elbow sections 36 and 38 resulting in a dustless slurry coming out of the discharge pipe 40. This slurry is then transported to slurry holding ponds or molds where it sets hard due to the correct proportioning of the ash/water slurry.

The example hereinbefore set out is not meant for the purpose of restricting the invention to those particular pipe sizes, aerated ash and water volumes and pressures but simply sets out an example that is known to provide excellent results.

From the foregoing it is apparent that the present invention provides a slurry gun which efficiently and effectively entrains fly ash particles in a slurry for subsequent disposal.

Whereas, the present invention has been described in particular relation to the drawings attached hereto, other and further modifications apart from those shown are suggested herein may be made within the spirit and scope of the invention.

What is claimed is:

1. A method for mixing a slurry of fly ash and a wetting agent comprising the steps of:
   (a) introducing the wetting agent horizontally into an introduction chamber under pressure and at a controlled volume;
   (b) introducing aerated fly ash downwardly into said chamber under a pressure less than that of the wetting agent and at a controlled volume of air and a controlled amount of fly ash carried by the air; and
   (c) creating turbulence downstream of the introduction chamber by passing the wetting agent and aerated fly ash through a contorted path for thoroughly mixing the fly ash and wetting agent.

2. A method as set forth in claim 1 wherein the wetting agent is water.

3. A method as set forth in claim 1 wherein turbulence is created by the routing of combined fly ash and wetting agent through a pair of consecutive pipe elbows.

* * * * *